US012451270B2

(12) United States Patent
Goto et al.

(10) Patent No.: US 12,451,270 B2
(45) Date of Patent: Oct. 21, 2025

(54) DIFFERENTIAL SIGNAL TRANSMISSION CABLE

(71) Applicant: SUMITOMO ELECTRIC INDUSTRIES, LTD., Osaka (JP)

(72) Inventors: Kengo Goto, Osaka (JP); Akihisa Hosoe, Osaka (JP); Yuto Kobayashi, Tochigi (JP); Yuji Ochi, Tochigi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/274,902

(22) PCT Filed: Feb. 18, 2021

(86) PCT No.: PCT/JP2021/006167
§ 371 (c)(1),
(2) Date: Jul. 28, 2023

(87) PCT Pub. No.: WO2022/176121
PCT Pub. Date: Aug. 25, 2022

(65) Prior Publication Data
US 2024/0312672 A1 Sep. 19, 2024

(51) Int. Cl.
*H01B 11/06* (2006.01)
*H01B 7/08* (2006.01)
*H01B 11/00* (2006.01)

(52) U.S. Cl.
CPC .......... *H01B 11/06* (2013.01); *H01B 7/0823* (2013.01); *H01B 11/002* (2013.01)

(58) Field of Classification Search
CPC . H01B 3/445; H01B 7/02; H01B 7/04; H01B 7/06; H01B 7/08; H01B 7/0823; H01B 9/02; H01B 9/04; H01B 9/06; H01B 9/08; H01B 9/0088; H01B 11/02; H01B 11/002; H01B 11/06; H01B 13/0036
(Continued)

(56) References Cited

U.S. PATENT DOCUMENTS 6,551,658 B1 * 4/2003 Clough .................... C23C 8/02 427/217
2012/0298395 A1 * 11/2012 Gundel .................. H04L 41/28 174/105 R
(Continued)

FOREIGN PATENT DOCUMENTS

JP S54-111839 A 9/1979
JP 2001-076545 A 3/2001
(Continued)

OTHER PUBLICATIONS

Office Action for U.S. Appl. No. 18/286,019 dated Apr. 17, 2025.
Office Action mailed Aug. 14, 2025 in corresponding U.S. Appl. No. 18/286,019.

*Primary Examiner* — William H. Mayo, III
(74) *Attorney, Agent, or Firm* — Renner, Otto, Boisselle & Sklar, LLP

(57) ABSTRACT

A differential signal transmission cable includes: an insulating layer that extends along a longitudinal direction of the differential signal transmission cable; a pair of signal lines that extends along the longitudinal direction of the differential signal transmission cable and is buried in the insulating layer; and a shield that exists around an outer peripheral surface of the insulating layer.

40 Claims, 18 Drawing Sheets

(58) Field of Classification Search
USPC ....... 174/110 R–120 SR; 427/212, 216, 217, 427/436
See application file for complete search history.

(56) References Cited

U.S. PATENT DOCUMENTS

| | | | | |
|---|---|---|---|---|
| 2014/0213716 | A1* | 7/2014 | Okada | C09J 153/02 524/502 |
| 2016/0165768 | A1 | 6/2016 | Tanaka | |
| 2019/0191601 | A1* | 6/2019 | Suenaga | H01B 13/0036 |

FOREIGN PATENT DOCUMENTS

| | | | | |
|---|---|---|---|---|
| JP | 2008004275 | A * | 1/2008 | H01B 11/20 |
| JP | 2016-015255 | A | 1/2016 | |
| JP | 2017-130350 | A | 7/2017 | |
| JP | 2019-016451 | A | 1/2019 | |
| JP | 2019-110022 | A | 7/2019 | |
| JP | 2019-125563 | A | 7/2019 | |
| WO | 2010/023972 | A1 | 3/2010 | |
| WO | 2015/001817 | A1 | 1/2015 | |
| WO | 2019/150542 | A1 | 8/2019 | |

* cited by examiner

DIFFERENTIAL SIGNAL TRANSMISSION CABLE

TECHNICAL FIELD

The present disclosure relates to a differential signal transmission cable.

BACKGROUND ART

PTL 1 (Japanese Patent Laying-Open No. 2019-16451) describes a differential signal transmission cable. The differential signal transmission cable described in PTL 1 includes an insulating layer, a pair of signal lines, and an electroless plating layer. The pair of signal lines is buried in the insulating layer. The electroless plating layer is formed on an outer peripheral surface of the insulating layer.

CITATION LIST

Patent Literature

PTL 1: Japanese Patent Laying-Open No. 2019-16451

SUMMARY OF INVENTION

A differential signal transmission cable of the present disclosure includes: an insulating layer that extends along a longitudinal direction of the differential signal transmission cable; a pair of signal lines that extends along the longitudinal direction of the differential signal transmission cable and is buried in the insulating layer; and a shield that exists around an outer peripheral surface of the insulating layer. The differential signal transmission cable of the present disclosure further includes an improvement.

DETAILED DESCRIPTION

Figure 1:
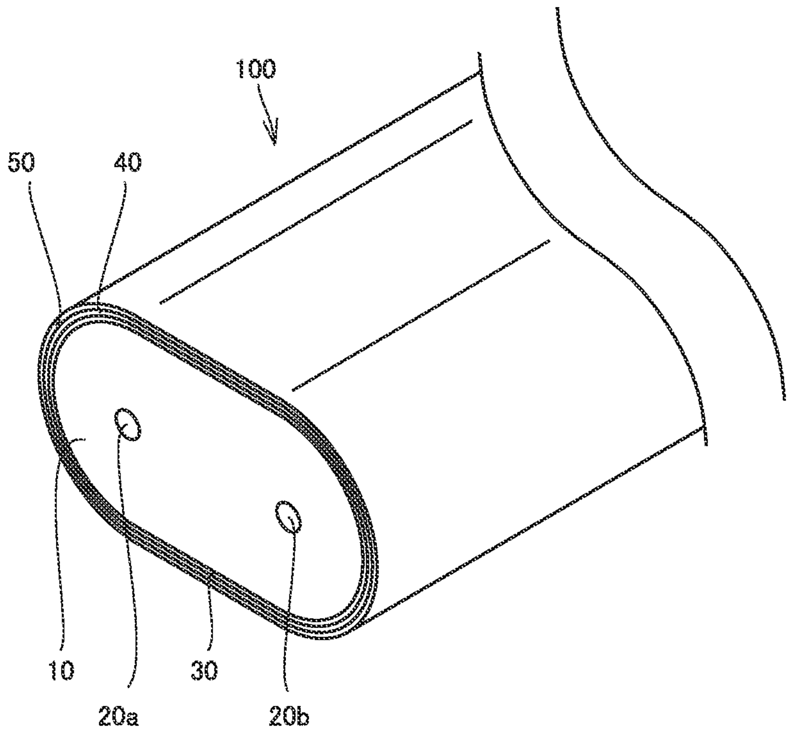
FIG. 1 is a perspective view of a drill 100.

Problem to be Solved by Present Disclosure

In the differential signal transmission cable described in PTL 1, the outer peripheral surface of the insulating layer is roughened by etching. Thus, an anchor effect between the insulating layer and the electroless plating layer is obtained, so that adhesion between the insulating layer and the electroless plating layer is secured.

However, unevenness exists on the outer peripheral surface of the insulating layer after etching. This unevenness causes degradation of a transmission characteristic in a high frequency region greater than or equal to 30 GHz.

The present disclosure has been made in view of the above-described problems of the prior art. More specifically, the present disclosure provides a differential signal transmission cable having the good transmission characteristic in a high frequency region.

Advantageous Effect of the Present Disclosure

According to the differential signal transmission cable of the present disclosure, the good transmission characteristic can be obtained in the high frequency region.

DESCRIPTION OF EMBODIMENTS

First, embodiments of the present disclosure will be listed and described.

(1) A differential signal transmission cable according to a first aspect of the present disclosure includes: an insulating layer that extends along a longitudinal direction of the differential signal transmission cable; a pair of signal lines that extends along the longitudinal direction of the differential signal transmission cable and is buried in the insulating layer; a shield that exists around an outer peripheral surface of the insulating layer; and a metal oxide layer that exists between the shield and the insulating layer.

According to the differential signal transmission cable of (1), adhesion between the shield and the insulating layer and a good transmission characteristic in a high frequency region can be obtained.

(2) The differential signal transmission cable of (1) may further include an intermediate layer that covers the outer peripheral surface of the insulating layer. The metal oxide layer may cover the outer peripheral surface of the intermediate layer.

(3) In the differential signal transmission cable of (2), the metal oxide layer may be a copper oxide layer.

(4) The differential signal transmission cable of (2) or (3) may further include a first catalyst particle in the metal oxide layer.

(5) In the differential signal transmission cable of (4), the first catalyst particle may be a particle containing palladium.

(6) In the differential signal transmission cables of (2) to (5), a thickness of the metal oxide layer may be smaller than a thickness of the intermediate layer in the section orthogonal to the longitudinal direction of the differential signal transmission cable.

(7) In the differential signal transmission cables of (2) to (6), in the section orthogonal to the longitudinal direction of the differential signal transmission cable, the thickness of the metal oxide layer may be greater than or equal to 0.001 times and less than or equal to 0.9 times the thickness of the intermediate layer.

(8) In the differential signal transmission cables of (2) to (7), the thickness of the metal oxide layer may be greater than or equal to 1.5 nm and less than or equal to 223 nm in the section orthogonal to the longitudinal direction of the differential signal transmission cable.

(9) In the differential signal transmission cables of (2) to (8), the metal oxide layer may have a first surface facing an intermediate layer side and a second surface facing a shield side in the section orthogonal to the longitudinal direction of the differential signal transmission cable. The first surface may include a first recess recessed toward a second surface side and a first protrusion protruding to the side opposite to the second surface in the section orthogonal to the longitudinal direction of the differential signal transmission cable.

(10) In the differential signal transmission cable of (9), the second surface may include a second recess recessed toward a first surface side and a second protrusion protruding to a side opposite to the first surface in the section orthogonal to the longitudinal direction of the differential signal transmission cable.

(11) In the differential signal transmission cables of (2) to (8), the thickness of the metal oxide layer may vary along the outer peripheral surface of the intermediate layer in the section orthogonal to the longitudinal direction of the differential signal transmission cable.

(12) In the differential signal transmission cables of (2) to (11), the metal oxide layer may cover the outer peripheral surface of the intermediate layer over an entire circumference in the section orthogonal to the longitudinal direction of the differential signal transmission cable.

(13) In the differential signal transmission cables of (2) to (11), the intermediate layer and the shield may be partially in contact with each other in the section orthogonal to the longitudinal direction of the differential signal transmission cable.

(14) In the differential signal transmission cables of (2) to (13), the intermediate layer may contain polyolefin.

(15) In the differential signal transmission cables of (2) to (13), the intermediate layer may contain an acrylonitrile butadiene styrene resin.

(16) The differential signal transmission cables of (2) to (15) may further include a second catalyst particle that exists on the intermediate layer.

(17) In the differential signal transmission cable of (16), the second catalyst particle may be a particle containing palladium.

(18) In the differential signal transmission cables of (1) to (17), the shield may include a plating layer.

(19) In the differential signal transmission cable of (18), the plating layer may be in contact with the metal oxide layer.

(20) In the differential signal transmission cable of (18) or (19), the plating layer may include an electroless plating layer.

(21) In the differential signal transmission cable of (20), the electroless plating layer may be in contact with the metal oxide layer.

(22) In the differential signal transmission cable of (21), adhesive strength between the electroless plating layer and the metal oxide layer may be greater than or equal to 0.1 N/cm and less than or equal to 20 N/cm.

(23) In the differential signal transmission cables of (20) to (22), the plating layer may include an electrolytic plating layer.

(24) In the differential signal transmission cable of (23), the electrolytic plating layer may be formed on the electroless plating layer.

(25) In the differential signal transmission cables of (1) to (24), pull-out strength of each of the pair of signal lines from the insulating layer may be greater than or equal to 0.8 N and less than or equal to 82.5 N.

(26) In the differential signal transmission cables of (1) to (25), arithmetic average roughness of an outer peripheral surface of each of the pair of signal lines may be greater than or equal to 0.009 μm and less than or equal to 0.54 μm.

(27) In the differential signal transmission cables of (1) to (26), in the section orthogonal to the longitudinal direction of the differential signal transmission cable, the insulating layer may include a first portion that is a portion at a distance of up to 50 μm from the outer peripheral surface of each of the pair of signal lines and a second portion that is a portion at a distance of up to 50 μm from the outer peripheral surface of the insulating layer. Hardness of the second portion may be smaller than hardness of the first portion.

(28) In the differential signal transmission cable of (27), the hardness of the first portion may be greater than or equal to 0.02 GPa and less than or equal to 0.11 GPa.

(29) In the differential signal transmission cable of (27) or (28), the hardness of the second portion may be greater than or equal to 0.01 GPa and less than or equal to 0.10 GPa.

(30) In the differential signal transmission cables of (1) to (29), the insulating layer may contain at least one of polyethylene, a cyclic olefin polymer, polymethylpentene, and polypropylene.

(31) In the differential signal transmission cables of (1) to (29), the insulating layer may contain polyolefin having a melting point greater than or equal to 120° C.

(32) In the differential signal transmission cables of (1) to (29), the insulating layer may be a foamed resin layer.

(33) In the differential signal transmission cables of (1) to (32), the pair of signal lines may be a first signal line and a second signal line. In the section orthogonal to the longitudinal direction of the differential signal transmission cable, the insulating layer may include a third portion in which the first signal line is buried and a fourth portion in which the second signal line is buried.

(34) In the differential signal transmission cable of (33), in the section orthogonal to the longitudinal direction of the differential signal transmission cable, a width of the insulating layer in a first direction may be larger than a width of the insulating layer in a second direction orthogonal to the first direction.

(35) In the differential signal transmission cable of (34), the third portion and the fourth portion may be arranged along the first direction.

(36) In the differential signal transmission cable of (35), the insulating layer may further include a fifth portion that exists between the third portion and the fourth portion in the first direction and is integrally formed with the third portion and the fourth portion.

(37) In the differential signal transmission cable of (36), a width of the fifth portion in the second direction may be smaller than a width of the third portion in the second direction and a width of the fourth portion in the second direction.

(38) The differential signal transmission cables of (1) to (3) may further include a first catalyst particle that exists in the metal oxide layer; and a second catalyst particle that exists on the intermediate layer. A total content of the first catalyst particle and the second catalyst particle contained in the differential signal transmission cable may be greater than or equal to 0.1 μg and less than or equal to 10 μg per 1 cm along the longitudinal direction.

(39) A differential signal transmission cable according to a second aspect of the present disclosure includes: an insulating layer that extends along a longitudinal direction of the differential signal transmission cable; a pair of signal lines that extends along the longitudinal direction of the differential signal transmission cable and is buried in the insulating layer; and a shield that exists around an outer peripheral surface of the insulating layer. Pull-out strength of each of the pair of signal lines from the insulating layer is greater than or equal to 0.8 N and less than or equal to 82.5 N.

According to the differential signal transmission cable of (39), adhesion between the shield and the insulating layer and a good transmission characteristic in a high frequency region can be obtained.

(40) A differential signal transmission cable according to a third aspect of the present disclosure includes: an insulating layer that extends along a longitudinal direction of the differential signal transmission cable; a pair of signal lines that extends along the longitudinal direction of the differential signal transmission cable and is buried in the insulating layer; and a shield that exists around an outer peripheral surface of the insulating layer. In a section orthogonal to the longitudinal direction of the differential signal transmission cable, the insulating layer includes a first portion that is a portion at a distance of up to 50 μm from an outer peripheral surface of each of the pair of signal lines and a second portion that is a portion at a distance of up to 50 μm from an outer peripheral surface of the insulating layer. Hardness of the second portion is smaller than hardness of the first portion.

According to the differential signal transmission cable of (40), peeling of the insulating layer from the signal line can be prevented when the differential signal transmission cable is bent.

DETAILED DESCRIPTION OF EMBODIMENTS

With reference to the drawings, the embodiment of the present disclosure will be described in detail. In the following drawings, the same or corresponding component is designated by the same reference numeral, and the overlapping description will be omitted.

Hereinafter, a differential signal transmission cable (referred to as a "cable 100") of the embodiment will be described.

<Configuration of Cable 100>

Figure 2:
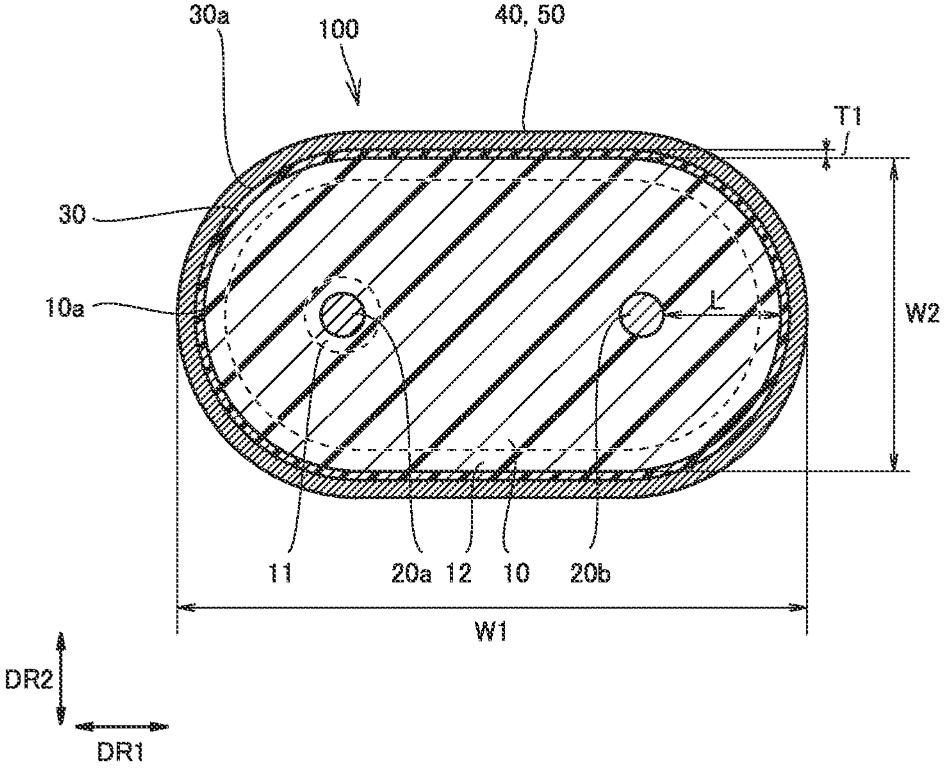
FIG. 2 is a sectional view of the cable 100.
Figure 3:
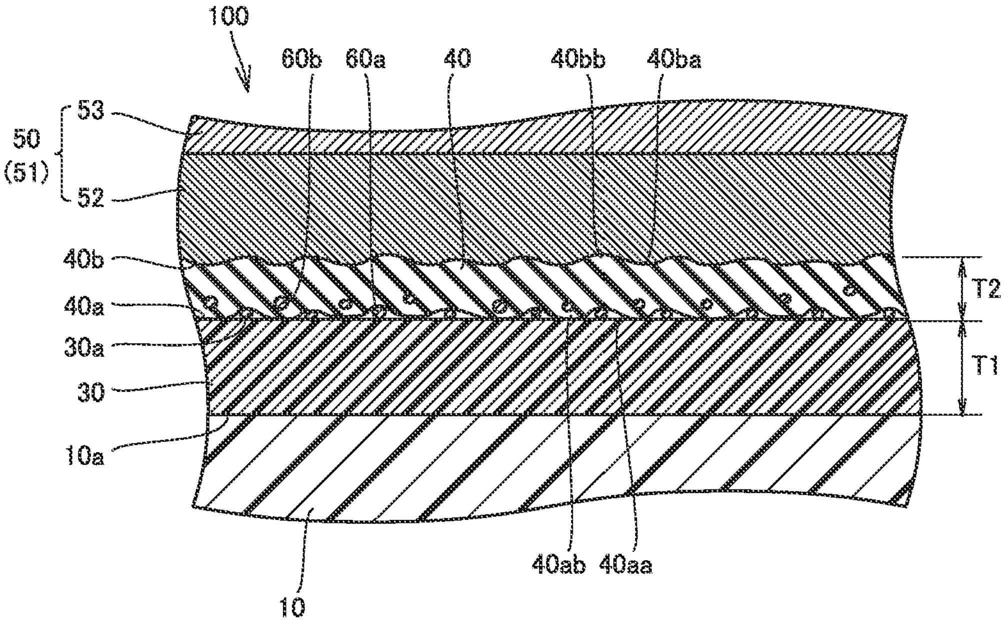
FIG. 3 is an enlarged sectional view illustrating the cable 100 in the vicinity of an outer peripheral surface 30*a*.

FIG. 1 is a perspective view of cable 100. FIG. 2 is a sectional view of cable 100. FIG. 2 illustrates a section orthogonal to a longitudinal direction of cable 100. FIG. 3 is an enlarged sectional view illustrating cable 100 in the vicinity of an outer peripheral surface 30*a*. As illustrated in FIGS. 1 to 3, cable 100 includes an insulating layer 10, a signal line 20*a*, a signal line 20*b*, an intermediate layer 30, a metal oxide layer 40, a shield 50, a catalyst particles 60*a*, and a catalyst particle 60*b*.

Insulating layer 10 extends along the longitudinal direction of cable 100. Insulating layer 10 is formed of an electrically insulating material. Insulating layer 10 may be formed of a foamed resin. That is, insulating layer 10 may be a foamed resin layer. For example, a thickness of insulating layer 10 (a distance between an outer peripheral surface 10*a* described later and an outer peripheral surface of signal line 20*a* or signal line 20*b*) is greater than or equal to 110 μm and less than or equal to 560 μm. However, the thickness of insulating layer 10 is not limited thereto.

For example, insulating layer 10 is formed of polyethylene, a cyclic olefin polymer, polymethylpentene, or polypropylene. Insulating layer 10 may be a layer containing one or a plurality of these materials. When polyolefin is used for insulating layer 10, the melting point of the polyolefin is preferably greater than or equal to 120° C. from the viewpoint of heat resistance.

Insulating layer 10 includes outer peripheral surface 10*a*. Insulating layer 10 includes a first portion 11 and a second portion 12. First portion 11 is a portion where the distance from the outer peripheral surface of signal line 20*a* (signal line 20*b*) is up to 50 μm. Second portion 12 is a portion having the distance of up to 50 μm from outer peripheral surface 10*a*. Hardness of second portion 12 is preferably less than hardness of first portion 11. For example, the hardness of first portion 11 is greater than or equal to 0.02 GPa and less than or equal to 0.11 GPa. The hardness of second portion 12 is greater than or equal to 0.01 GPa and less than or equal to 0.10 GPa.

The hardness of first portion 11 may be greater than or equal to 1.03 times the hardness of second portion 12. The hardness of first portion 11 may be greater than or equal to 1.10 times the hardness of second portion 12. The hardness of first portion 11 may be less than or equal to 1.50 times the hardness of second portion 12. The hardness of first portion 11 may be less than or equal to 2.00 times the hardness of second portion 12.

The hardness of first portion 11 may be greater than or equal to 1.03 times and less than or equal to 1.50 times the hardness of second portion 12. The hardness of first portion 11 may be greater than or equal to 1.03 times and less than or equal to 2.00 times the hardness of second portion 12. The hardness of first portion 11 may be greater than or equal to 1.10 times and less than or equal to 1.50 times the hardness of second portion 12.

When insulating layer 10 is made of polyethylene, for example, the hardness of first portion 11 is greater than or equal to 0.024 GPa. In this case, the hardness of first portion 11 may be greater than or equal to 0.024 GPa and less than or equal to 0.030 GPa.

When insulating layer 10 is made of polyethylene, for example, the hardness of second portion 12 is less than or equal to 0.024 GPa. In this case, the hardness of second portion 12 may be greater than or equal to 0.021 GPa and less than or equal to 0.024 GPa.

When insulating layer 10 is made of polypropylene, for example, the hardness of first portion 11 is greater than or equal to 0.060 GPa. In this case, the hardness of first portion 11 may be greater than or equal to 0.060 GPa and less than or equal to 0.090 GPa.

When insulating layer 10 is made of polypropylene, for example, the hardness of second portion 12 is less than or equal to 0.060 GPa. In this case, the hardness of the second portion 12 may be greater than or equal to 0.045 GPa and less than or equal to 0.060 GPa.

Cable 100 has a first direction DR1 and a second direction DR2. First direction DR1 is orthogonal to the longitudinal direction of cable 100. Second direction DR2 is orthogonal to the longitudinal direction of cable 100 and is orthogonal to first direction DR1. Insulating layer 10 has a width W1 along first direction DR1 and a width W2 along second direction DR2. For example, width W1 is larger than width W2.

The hardness in first portion 11 and second portion 12 is measured using a tripoindenter Hysitron TI 980 manufactured by Bruker Corporation. In this measurement, a Berkovich indenter is used as an indenter. A maximum load is 8 mN. A loading time is 5 seconds. A maximum load holding time is 0 seconds. This measurement is performed at 25° C. in the atmosphere.

Signal line 20*a* and signal line 20*b* form a pair. A signal having a phase opposite to that of the signal applied to signal line 20*a* is applied to signal line 20*b*. Thus, a differential signal is transmitted through cable 100.

Signal line 20*a* and signal line 20*b* are buried in insulating layer 10. Signal line 20*a* and signal line 20*b* extend along the longitudinal direction of cable 100. Signal line 20*a* and signal line 20*b* are formed of a conductive material. For example, signal line 20*a* and signal line 20*b* are formed of copper (Cu). However, the material configuring signal line 20*a* and signal line 20*b* is not limited to copper. For example, signal line 20*a* and signal line 20*b* are arranged along first direction DR1.

Arithmetic average roughness of the outer peripheral surfaces of signal line 20*a* and signal line 20*b* is preferably greater than or equal to 0.009 μm and less than or equal to 0.54 μm. The arithmetic average roughness of the outer peripheral surfaces of signal line 20*a* and signal line 20*b* is controlled by the arithmetic average roughness of the inner peripheral surface of a metal mold used when signal line 20*a* and signal line 20*b* are drawn. The arithmetic average roughness of the outer peripheral surface of signal line 20*a* (signal line 20*b*) is measured by a laser microscope VM-X150 (manufactured by KEYENCE CORPORATION). More specifically, the outer peripheral surface of signal line 20*a* (signal line 20*b*) is observed using a 50-times objective lens, and the analysis software VK-H1XM is applied to the observation result, whereby the arithmetic average roughness on the outer peripheral surface of signal line 20*a* (signal line 20*b*) is calculated.

The pull-out strength during pulling out signal line 20*a* (signal line 20*b*) from insulating layer 10 is preferably greater than or equal to 0.8 N and less than or equal to 82.5 N. The pull-out strength during pulling out signal line 20*a* (signal line 20*b*) from insulating layer 10 is measured by the following method.

Figure 4:
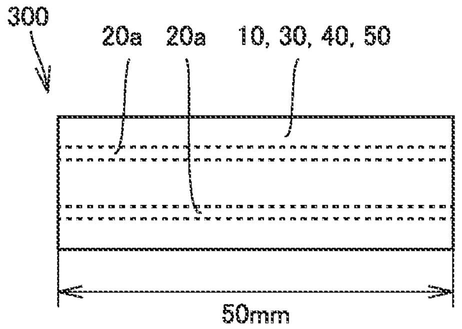
FIG. 4 is a first schematic diagram illustrating a method for measuring pull-out strength when a signal line 20*a* is pulled out from an insulating layer 10.

First, a test piece 300 is prepared. FIG. 4 is a first schematic diagram illustrating a method for measuring pull-out strength when signal line 20*a* is pulled out from insulating layer 10. As illustrated in FIG. 4, cable 100 having a length of 50 mm is prepared as test piece 300.

Figure 5:
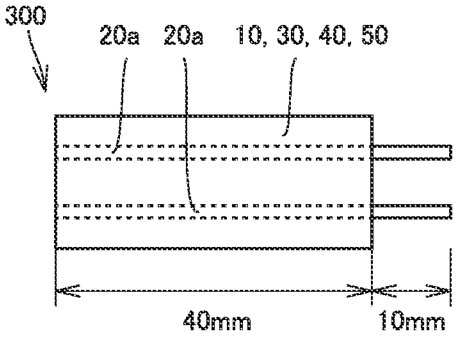
FIG. 5 is a second schematic diagram illustrating the method for measuring the pull-out strength when the signal line 20*a* is pulled out from the insulating layer 10.

Second, insulating layer 10 at the end of test piece 300 is removed. FIG. 5 is a second schematic diagram illustrating the method for measuring the pull-out strength when signal line 20*a* is pulled out from insulating layer 10. As illustrated in FIG. 5, the width of removed insulating layer 10 is 10 mm. Thus, signal line 20*a* and signal line 20*b* having the length of 10 mm are exposed from the end of test piece 300. As insulating layer 10 at the end of test piece 300 is removed, intermediate layer 30, metal oxide layer 40, and shield 50 on insulating layer 10 at the end of test piece 300 are also removed.

Figure 6:
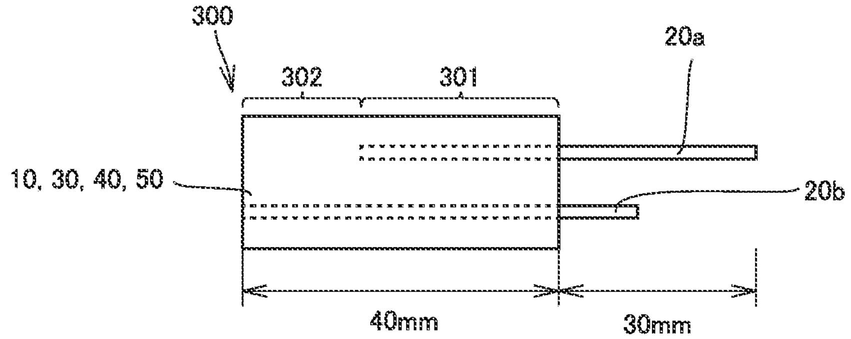
FIG. 6 is a third schematic view illustrating the method for measuring the pull-out strength when the signal line 20*a* is pulled out from the insulating layer 10.

Third, signal line 20*a* is drawn out. FIG. 6 is a third schematic view illustrating the method for measuring the pull-out strength when signal line 20*a* is pulled out from insulating layer 10. As illustrated in FIG. 6, signal line 20*a* is drawn out such that the length exposed from insulating layer 10 is 30 mm. As a result, test piece 300 includes a first region 301 in which signal line 20*a* exists inside insulating layer 10 and a second region 302 in which signal line 20*a* does not exist inside insulating layer 10.

Figure 7:
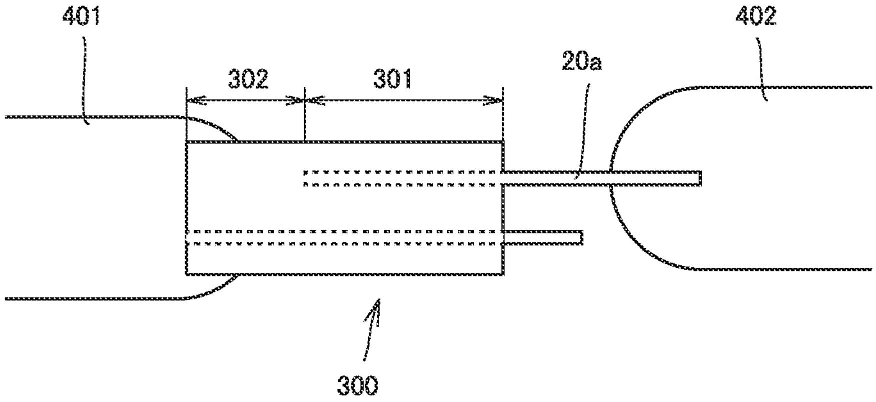
FIG. 7 is a fourth schematic diagram illustrating the method for measuring the pull-out strength when the signal line 20*a* is pulled out from the insulating layer 10.

Fourth, signal line 20*a* is extracted from insulating layer 10. FIG. 7 is a fourth schematic diagram illustrating the method for measuring the pull-out strength when signal line 20*a* is pulled out from insulating layer 10. As illustrated in FIG. 7, a tensile tester is used to pull out signal line 20*a* from insulating layer 10. For example, the tensile tester is EZ-LX manufactured by Shimadzu Corporation. The tensile tester includes a first chuck 401 and a second chuck 402. First chuck 401 chucks second region 302. Second chuck 402 chucks signal line 20*a* exposed from insulating layer 10. The tensile tester moves first chuck 401 and second chuck 402 away from each other to pull out signal line 20*a* from insulating layer 10. At this time, the maximum value of the force detected by the tensile tester is the pull-out strength when signal line 20*a* is pulled out from insulating layer 10.

Intermediate layer 30 covers outer peripheral surface 10*a*. Intermediate layer 30 includes outer peripheral surface 30*a*. Intermediate layer 30 is formed of an electrically insulating material. For example, intermediate layer 30 is formed of polyolefin. Intermediate layer 30 may be formed of acrylonitrile butadiene styrene resin (ABS resin). The thickness of intermediate layer 30 depends on an amount of the electrically insulating material configuring intermediate layer 30 applied onto insulating layer 10.

Metal oxide layer 40 is a layer of metal oxide. For example, the metal oxide is copper oxide (CuO). However, the metal oxide is not limited to copper oxide. Metal oxide layer 40 covers outer peripheral surface 30*a*. Metal oxide layer 40 preferably covers outer peripheral surface 30*a* over the entire circumference. However, metal oxide layer 40 may not cover a part of outer peripheral surface 30*a*. In this case, the part of outer peripheral surface 30*a* is in contact with shield 50.

Metal oxide layer 40 includes a first surface 40*a* and a second surface 40*b* opposite to first surface 40*a*. First surface 40*a* is a surface facing the side of intermediate layer 30. Second surface 40*b* is a surface facing the side of shield 50. Metal oxide layer 40 is in contact with intermediate layer 30 on first surface 40*a*, and is in contact with shield 50 on second surface 40*b*.

In a section orthogonal to the longitudinal direction of cable 100, first surface 40*a* may have an irregular shape. That is, first surface 40*a* includes a plurality of recesses 40*aa* and a plurality of protrusions 40*ab*. First surface 40*a* is recessed toward the side of second surface 40*b* in recess 40*aa*, and protrudes to the side opposite to second surface 40*b* in protrusion 40*ab*.

In the section orthogonal to the longitudinal direction of cable 100, second surface 40*b* may have an irregular shape. That is, second surface 40*b* includes a plurality of recesses 40*ba* and a plurality of protrusions 40*bb*. Second surface 40*b* is recessed toward the side of first surface 40*a* in recess 40*ba*, and protrudes toward the side opposite to first surface 40*a* in protrusion 40*bb*.

In the section orthogonal to the longitudinal direction of cable 100, a thickness T2 of metal oxide layer 40 is preferably smaller than a thickness T1 of intermediate layer 30. Thickness T2 is preferably greater than or equal to 0.001 times thickness T1 and less than or equal to 0.9 times thickness T1. For example, thickness T1 is greater than or equal to 200 nm and less than or equal to 1000 nm. However, thickness T1 is not limited thereto. For example, thickness T2 is greater than or equal to 1.5 nm and less than or equal to 223 nm. Thickness T2 is preferably greater than or equal to 2.9 nm and less than or equal to 130 nm. However, thickness T2 is not limited thereto.

Shield 50 covers second surface 40*b*. That is, shield 50 is located around the outer peripheral surface 10*a* with intermediate layer 30 and metal oxide layer 40 interposed therebetween. Metal oxide layer 40 is between insulating layer 10 and shield 50. Metal oxide layer 40 is between intermediate layer 30 and shield 50. Shield 50 has conductivity.

For example, shield 50 is a copper layer 51. Copper layer 51 is a layer formed by plating. For example, copper layer 51 includes a first copper layer 52 formed by electroless plating. Copper layer 51 may further include a second copper layer 53 formed by electrolytic plating.

For example, first copper layer 52 is an electroless copper plating layer. First copper layer 52 is in contact with metal oxide layer 40. For example, second copper layer 53 is an electrolytic copper plating layer. Second copper layer 53 is formed on first copper layer 52.

Catalyst particle 60*a* exists in metal oxide layer 40. The surface of catalyst particle 60*a* is covered with metal oxide layer 40. Catalyst particle 60*b* exists on outer peripheral surface 30*a*. The surface of catalyst particle 60*b* is partially in contact with outer peripheral surface 30*a*, and is partially in contact with first surface 40*a*.

For example, catalyst particle 60*a* and catalyst particle 60*b* are particles containing palladium (Pd). However, catalyst particle 60*a* and catalyst particle 60*b* are not limited to the particles containing palladium. For example, catalyst particle 60*a* and the catalyst particle 60*b* may be particles containing copper, silver (Ag), gold (Au), or the like. Catalyst particle 60*a* and catalyst particle 60*b* may contain different materials or contain the same material.

The total content of catalyst particle 60*a* and catalyst particle 60*b* included in cable 100 is preferably greater than or equal to 0.1 µg per 1 cm and less than or equal to 10 µg per 1 cm along the longitudinal direction of cable 100. The total content of catalyst particle 60*a* and catalyst particle 60*b* per 1 cm along the longitudinal direction of cable 100 is measured using an inductively coupled plasma mass spectrometer.

<Method for Manufacturing Cable 100>

Figure 8:
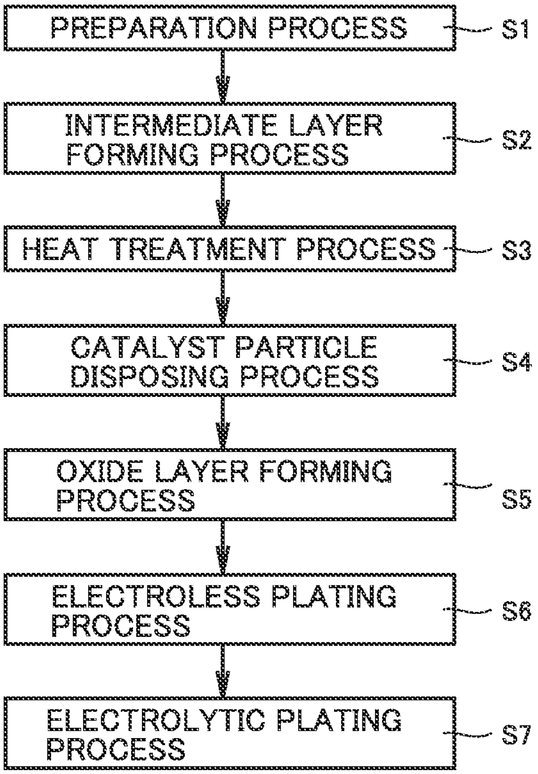
FIG. 8 is a process chart illustrating a method for manufacturing the cable 100.

FIG. 8 is a process chart illustrating a method for manufacturing the cable 100. As illustrated in FIG. 8, the method for manufacturing cable 100 includes a preparation process S1, an intermediate layer forming process S2, a heat treatment process S3, a catalyst particle disposing process S4, an oxide layer forming process S5, an electroless plating process S6, and an electrolytic plating process S7.

After preparation process S1, intermediate layer forming process S2 is performed. After intermediate layer forming process S2, heat treatment process S3 is performed. After heat treatment process S3, catalyst particle disposing process S4 is performed. After catalyst particle disposing process S4, oxide layer forming process S5 is performed. After oxide layer forming process S5, electroless plating process S6 is performed. After electroless plating process S6, electrolytic plating process S7 is performed.

Figure 9:
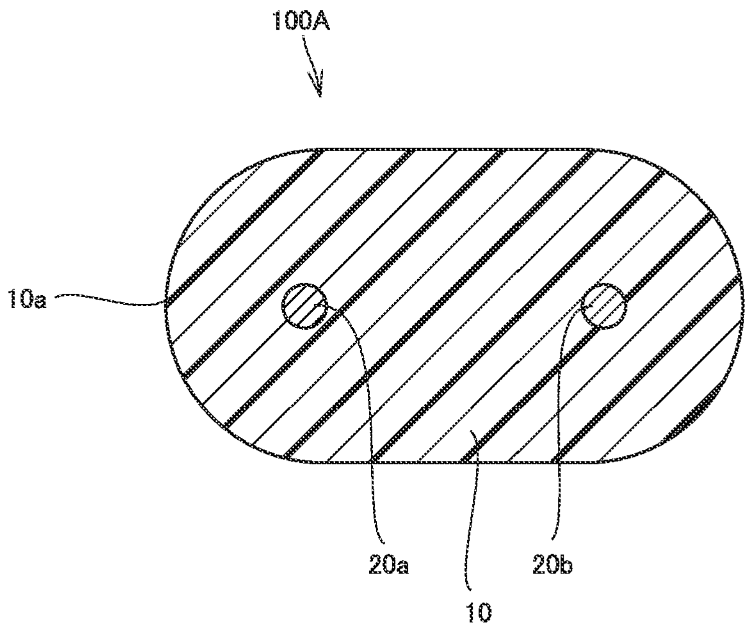
FIG. 9 is a sectional view illustrating a processing target member 100A prepared in a preparation process S1.

In preparation process S1, a processing target member 100A is prepared. FIG. 9 is a sectional view illustrating processing target member 100A prepared in preparation process S1. As illustrated in FIG. 9, processing target member 100A includes insulating layer 10, signal line 20*a*, and signal line 20*b*.

Figure 10:
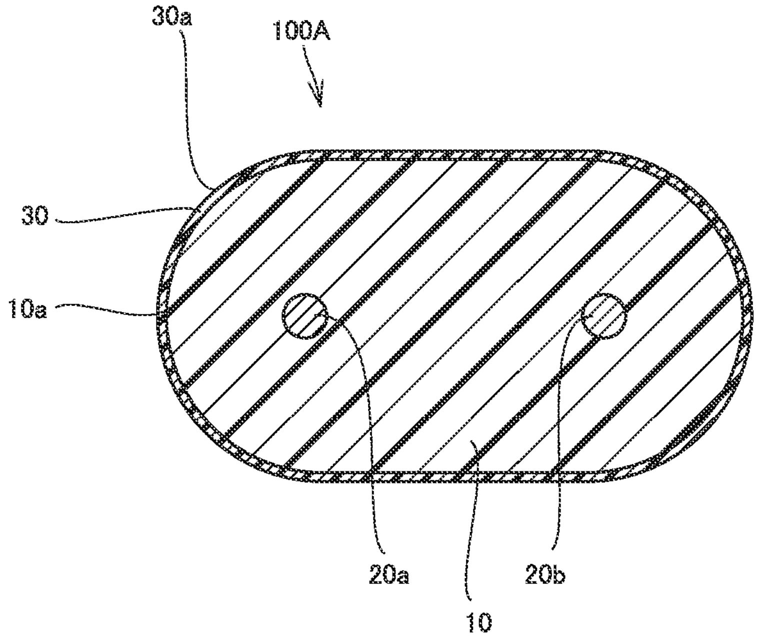
FIG. 10 is a sectional view illustrating the processing target member 100A after an intermediate layer forming process S2 is performed.

FIG. 10 is a sectional view illustrating processing target member 100A after intermediate layer forming process S2 is performed. As illustrated in FIG. 10, in intermediate layer forming process S2, intermediate layer 30 is formed so as to cover outer peripheral surface 10*a*. In intermediate layer forming process S2, the material configuring intermediate layer 30 is applied to outer peripheral surface 10*a*, and the applied material is cured to form intermediate layer 30 so as to cover outer peripheral surface 10*a*.

In heat treatment process S3, processing target member 100A on which intermediate layer 30 is formed is subjected to a heat treatment at a predetermined temperature for a predetermined time. For example, the predetermined temperature is greater than or equal to 80° C. and less than or equal to 120° C. For example, the predetermined time is greater than or equal to 1 minute and less than or equal to 30 minutes. In processing target member 100A after heat treatment process S3 is performed, the hardness of second portion 12 is smaller than the hardness of first portion 11.

Figure 11:
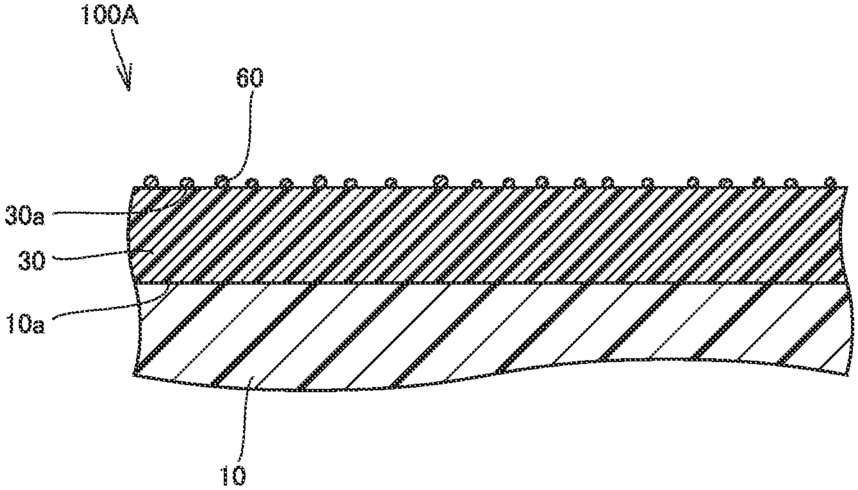
FIG. 11 is a sectional view illustrating the processing target member 100A after a catalyst particle disposing process S4 is performed.

FIG. 11 is a sectional view illustrating processing target member 100A after catalyst particle disposing process S4 is performed. As illustrated in FIG. 11, in catalyst particle disposing process S4, catalyst particles 60 are dispersed and disposed on outer peripheral surface 30*a*. In catalyst particle disposing process $4, a solution containing catalyst particles 60 is applied to outer peripheral surface 30*a*, and the solution is volatilized to disperse and dispose catalyst particles 60 on outer peripheral surface 30*a*.

Figure 12:
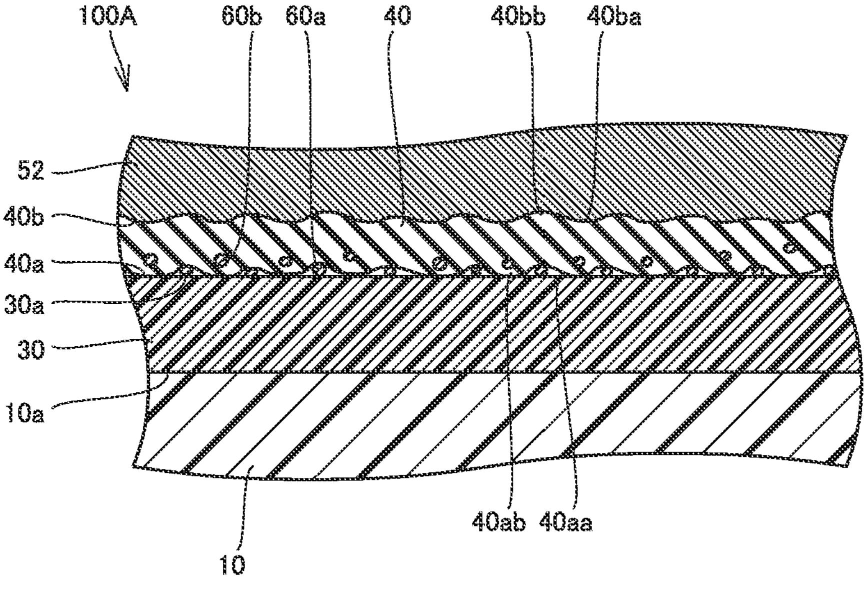
FIG. 12 is a sectional view illustrating the processing target member 100A after an oxide layer forming process S5 and an electroless plating process S6 are performed.

FIG. 12 is a sectional view illustrating processing target member 100A after oxide layer forming process S5 and electroless plating process S6 are performed. As illustrated in FIG. 12, metal oxide layer 40 is formed in oxide layer forming process S5, and first copper layer 52 is formed on metal oxide layer 40 in electroless plating process S6.

In oxide layer forming process S5, first, processing target member 100A is immersed in a plating solution in which the material contained in first copper layer 52 is dissolved and a gas containing oxygen (for example, air) is bubbled. Thus, metal oxide layer 40 is formed so as to cover outer peripheral surface 30*a* with catalyst particles 60 as nuclei. In catalyst particles 60, catalyst particle 60*a* is a nucleus of growth of metal oxide layer 40, and catalyst particle 60*b* is another catalyst particle.

In electroless plating process S6, the bubbling is stopped. As a result, first copper layer 52 is plated on metal oxide layer 40.

In electrolytic plating process S7, second copper layer 53 is formed so as to cover first copper layer 52. In electrolytic plating process S7, processing target member 100A is immersed in a plating solution in which the material contained in second copper layer 53 is dissolved, and first copper layer 52 is energized. Thus, second copper layer 53 is plated on first copper layer 52, and cable 100 having the structure in FIGS. 1 to 3 is manufactured.

<Effect of Cable 100>

In cable 100, a hydrogen bond is generated between metal oxide layer 40 and shield 50 (more specifically, first copper layer 52). This hydrogen bonding secures adhesion between metal oxide layer 40 and shield 50, and as a result, adhesion between insulating layer 10 and shield 50 is secured.

As described above, because shield 50 is in close contact with insulating layer 10 with metal oxide layer 40 interposed therebetween, in cable 100, the insertion loss in the high frequency region is hardly degraded due to the roughening of outer peripheral surface 10*a*. Accordingly, cable 100 has the good transmission characteristic in the high frequency region.

In cable 100, the hardness of second portion 12 is smaller than the hardness of first portion 11. Thus, sectional second moment of insulating layer 10 is reduced, and the deformation of cable 100 easily follows the deformation of insulating layer 10. For this reason, in this case, when cable 100 is bent, insulating layer 10 is hardly peeled off from signal line 20*a* (signal line 20*b*).

As the arithmetic average roughness on the outer peripheral surface of signal line 20*a* (signal line 20*b*) increases, the adhesion between signal line 20*a* (signal line 20*b*) and insulating layer 10 is improved. However, this high adhesion results in degradation of an attenuation characteristic in the high frequency region of cable 100. When the arithmetic average roughness of the outer peripheral surface of the signal line 20*a* (signal line 20*b*) is set to greater than or equal to 0.009 μm and less than or equal to 0.54 μm, the attenuation characteristic in the high frequency region of cable 100 can be maintained while the pull-out strength is secured when signal line 20*a* (signal line 20*b*) is pulled out from insulating layer 10 (more specifically, greater than or equal to 0.8 N and less than or equal to 82.5 N).

In the section orthogonal to the longitudinal direction of cable 100, when second surface 40*b* has an irregular shape (that is, second surface 40*b* includes recess 40*ba* and protrusion 40*bb*), the contact area between metal oxide layer 40 and shield 50 increases. Consequently, in this case, the hydrogen bond more strongly acts, and the adhesion of shield 50 can be further secured.

<First Modification>

Figure 13:
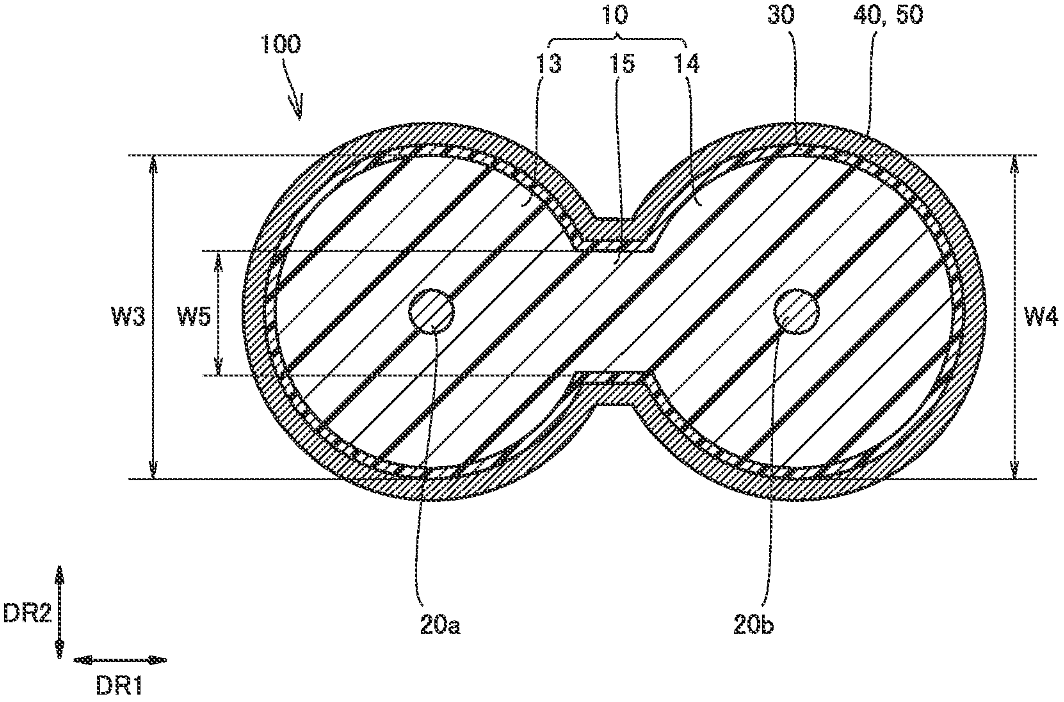
FIG. 13 is a sectional view illustrating the cable 100 according to a first modification.

As illustrated in FIG. 2, insulating layer 10 has the elliptical shape (the shape in which two semicircles are connected by the straight line) in the section orthogonal to the longitudinal direction of cable 100. However, the sectional shape of cable 100 is not limited thereto. FIG. 13 is a sectional view illustrating cable 100 according to a first modification. FIG. 13 illustrates the orthogonal to the longitudinal direction of cable 100 of the first modification. As illustrated in FIG. 13, in cable 100, insulating layer 10 may have a third portion 13, a fourth portion 14, and a fifth portion 15 in the section orthogonal to the longitudinal direction of cable 100.

Signal line 20*a* and signal line 20*b* are buried in third portion 13 and fourth portion 14, respectively. Third portion 13, fourth portion 14, and fifth portion 15 are arranged along first direction DR1. Fifth portion 15 is disposed between third portion 13 and fourth portion 14 in first direction DR1. Fifth portion 15 is formed integrally with third portion 13 and fourth portion 14.

A width W3 of third portion 13 in second direction DR2 and a width W4 of fourth portion 14 in second direction DR2 are larger than a width W5 of fifth portion 15 in second direction DR2. From another point of view, outer peripheral surface 10*a* includes a pair of notches opposite to each other in second direction DR2 between third portion 13 and fourth portion 14.

<Second Modification>

Cable 100 may not have intermediate layer 30. When cable 100 does not include intermediate layer 30, intermediate layer forming process S2 is omitted. In this case, metal oxide layer 40 directly covers outer peripheral surface 10*a*.

<Third Modification>

In the example of the method of manufacturing cable 100 in FIG. 8, heat treatment process S3 is performed after intermediate layer forming process S2. However, heat treatment process S3 may be performed after preparation process S1. Heat treatment process S3 may be performed after catalyst particle disposing process S4.

[Evaluation of Adhesion Between Shield 50 and Insulating Layer 10]

In order to evaluate the adhesion between shield 50 and insulating layer 10, Samples 1-1 to 1-10 of cable 100 were prepared. As illustrated in Table 1, in Samples 1-1 to 1-10, the material configuring insulating layer 10, the presence or absence of intermediate layer 30, the processing time in oxide layer forming process S5, the type of gas used for bubbling in oxide layer forming process S5, and the thickness of metal oxide layer 40 were changed.

TABLE 1

| | Sample 1-1 | Sample 1-2 | Sample 1-3 | Sample 1-4 | Sample 1-5 | Sample 1-6 | Sample 1-7 | Sample 1-8 | Sample 1-9 | Sample 1-10 |
|---|---|---|---|---|---|---|---|---|---|---|
| Material configuring insulating layer 10 | Polyethylene | Polyethylene | Polyethylene | Polyethylene | Polyethylene | Polyethylene | Polyethylene | Polyethylene | Polyethylene | Polypropylene |
| Presence or absence of intermediate layer 30 | Presence | Presence | Presence | Presence | Presence | Absence | Presence | Presence | Presence | Presence |
| Processing time (sec) of oxide layer forming process S5 | 0 | 3 | 5 | 20 | 60 | 90 | 300 | 30 | 30 | 30 |
| Type of gas supplied in oxide layer forming process S5 | — | Air | Air | Air | Air | Air | Air | 99% Nitrogen | 99% oxygen | Air |
| Thickness (nm) of metal oxide layer 40 | 0 | 1.5 | 2.9 | 15.5 | 50.3 | 130 | 223 | 0 | 31.3 | 34.5 |

TABLE 1-continued

| | Sample 1-1 | Sample 1-2 | Sample 1-3 | Sample 1-4 | Sample 1-5 | Sample 1-6 | Sample 1-7 | Sample 1-8 | Sample 1-9 | Sample 1-10 |
|---|---|---|---|---|---|---|---|---|---|---|
| Adhesion between shield 50 and insulating layer 10 | C | B | A | A | A | A | B | C | A | A |

Figure 14:
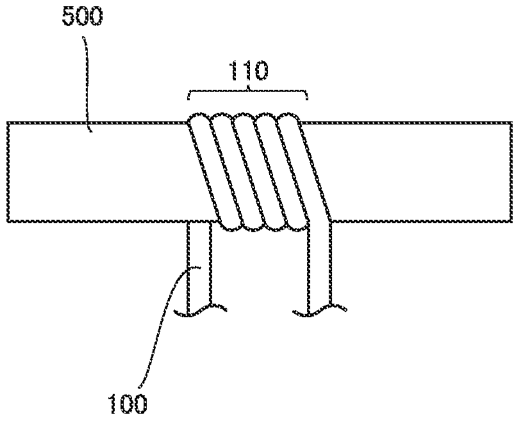
FIG. 14 is a first schematic view illustrating bending of the cable 100.

Adhesion between shield 50 and insulating layer 10 was evaluated by performing a tape peeling test after the bending of cable 100. FIG. 14 is a first schematic view illustrating the bending of cable 100. As illustrated in FIG. 14, in the bending, cable 100 is wound around a columnar member 500. A portion of cable 100 wound around columnar member 500 in the bending is defined as a bent unit 110.

Figure 15:
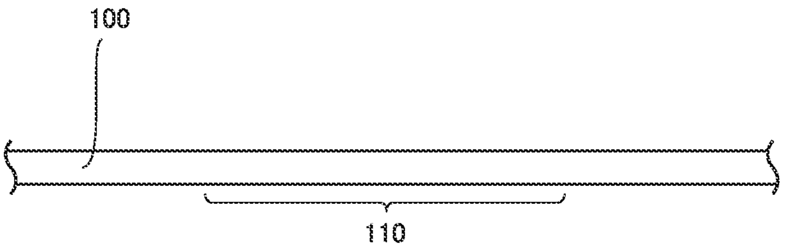
FIG. 15 is a second schematic view illustrating the bending of the cable 100.

FIG. 15 is a second schematic view illustrating the bending of cable 100. As illustrated in FIG. 15, after the winding is performed, cable 100 is removed from columnar member 500 and returns to the straight line.

Figure 16:
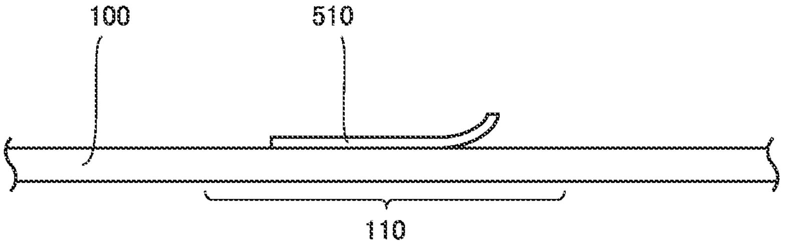
FIG. 16 is a schematic diagram illustrating a tape peeling test for the cable 100.

FIG. 16 is a schematic diagram illustrating the tape peeling test for cable 100. In the tape peeling test, first, tape 510 is stuck to bent unit 110 of cable 100 after the bending is performed. Tape 510 is a tape having adhesive force of 10±1 N/25 mm conforming to JIS standard (JIS 5400). Second, tape 510 is peeled off from bent unit 110 within 5 minutes after being stuck to bent unit 110. Adhesion between shield 50 and insulating layer 10 was evaluated according to whether the peeling of shield 50 is generated by the peeling of tape 510.

"A" in the column of "adhesion between shield 50 and insulating layer 10" in Table 1 indicates that the peeling was not generated in shield 50 in the tape peeling test after the bending was performed using columnar member 500 having a diameter of 100 mm. "B" in the column of "adhesion between the shield 50 and the insulating layer 10" in Table 1 indicates that the peeling was not generated in shield 50 in the tape peeling test after the bending was performed using columnar member 500 having the diameter of 200 mm, but the peeling was generated in shield 50 in the tape peeling test after the bending was performed using columnar member 500 having the diameter of 100 mm.

"C" in the column of "adhesion between shield 50 and insulating layer 10" in Table 1 indicates that the peeling was not generated in shield 50 in the tape peeling test after the bending was performed using columnar member 500 having the diameter of 300 mm, but the peeling was generated in shield 50 in the tape peeling test after the bending was performed using columnar member 500 having the diameter of 200 mm. From these, the adhesion between shield 50 and insulating layer 10 is the lowest when the column of "adhesion between shield 50 and insulating layer 10" in Table 1 is "C", and the adhesion between shield 50 and insulating layer 10 is the highest when the column of "adhesion between shield 50 and insulating layer 10" in Table 1 is "A".

As illustrated in Table 1, in Sample 1-1 and Sample 1-8, the evaluation of the adhesion between shield 50 and insulating layer 10 was C. On the other hand, in Samples 1-2 to 1-7, Sample 1-9, and Sample 1-10, the evaluation of the adhesion between shield 50 and insulating layer 10 was greater than or equal to B.

In Sample 1-1 and Sample 1-8, metal oxide layer 40 was not formed. On the other hand, in Samples 1-2 to 1-7, Sample 1-9, and Sample 1-10, metal oxide layer 40 was formed. From this comparison, it was clarified that the adhesion between shield 50 and insulating layer 10 was enhanced by cable 100 including metal oxide layer 40.

In Samples 1-2 and 1-7, the thickness of metal oxide layer 40 was not within the range greater than or equal to 2.9 nm and less than or equal to 130 nm. On the other hand, in Samples 1-3 to 1-6, Sample 1-9, and Sample 1-10, the thickness of metal oxide layer 40 was in the range greater than or equal to 2.9 nm and less than or equal to 130 nm. From this comparison, it was clarified that the adhesion between shield 50 and insulating layer 10 is further enhanced by setting the thickness of metal oxide layer 40 to greater than or equal to 2.9 nm and less than or equal to 130 nm.

[Evaluation of Flexibility of Insulating Layer 10]

In order to evaluate flexibility of insulating layer 10, Samples 2-1 to 2-9 of cable 100 were prepared. As illustrated in Table 2, in Samples 2-1 to 2-9, the material configuring insulating layer 10, the presence or absence of intermediate layer 30, the time for performing heat treatment process S3, and the temperature for performing heat treatment process S3 were changed. As a result, in Samples 2-1 to 2-9, the hardness in first portion 11 and the hardness in second portion changed.

TABLE 2

| | Sample 2-1 | Sample 2-2 | Sample 2-3 | Sample 2-4 | Sample 2-5 | Sample 2-6 | Sample 2-7 | Sample 2-8 | Sample 2-9 |
|---|---|---|---|---|---|---|---|---|---|
| Material configuring insulating layer 10 | Polyethylene | Polyethylene | Polyethylene | Polyethylene | Polyethylene | Polyethylene | Polyethylene | Polyethylene | Polypropylene |
| Presence or absence of intermediate layer 30 | Presence | Presence | Presence | Presence | Presence | Absence | Presence | Presence | Presence |
| Temperature (° C.) of heat treatment process S3 | 50 | 80 | 80 | 100 | 100 | 120 | 120 | 150 | 120 |

TABLE 2-continued

| | Sample 2-1 | Sample 2-2 | Sample 2-3 | Sample 2-4 | Sample 2-5 | Sample 2-6 | Sample 2-7 | Sample 2-8 | Sample 2-9 |
|---|---|---|---|---|---|---|---|---|---|
| Time (min) of heat treatment process S3 | 40 | 30 | 20 | 20 | 10 | 10 | 1 | 1 | 10 |
| Hardness (GPa) of first portion 11 | 0.026 | 0.026 | 0.026 | 0.025 | 0.026 | 0.025 | 0.026 | 0.022 | 0.073 |
| Hardness (GPa) of second portion 12 | 0.026 | 0.023 | 0.023 | 0.023 | 0.023 | 0.021 | 0.022 | 0.022 | 0.053 |
| Cable bending test result | B | A | A | A | A | A | A | C | A |

The flexibility of insulating layer 10 was evaluated by performing a cable bending test on cable 100. In the cable bending test, first, cable 100 is bent. The bending is performed by the method illustrated in FIGS. 14 and 15. The diameter of columnar member 500 used for the bending was 10 mm. Second, when the section of bent unit 110 was observed using a scanning electron microscope (SEM), whether a void exists between insulating layer 10 and signal line 20*a* (signal line 20*b*) was observed.

"A" in the column of "cable bending test result" in Table 2 indicates that the gap does not exist between insulating layer 10 and signal line 20*a* (signal line 20*b*) in bent unit 110 after the bending. "B" in the column of "cable bending test result" in Table 2 indicates that the gap exists between insulating layer 10 and signal line 20*a* (signal line 20*b*) in bent unit 110 after the bending.

"C" in the column of "cable bending test result" in Table 2 indicates that the insulating layer 10 was deformed before the bending. Accordingly, the cable bending test was not performed on Sample 2-8 in which the column of "cable bending test result" in Table 2 is "C".

As illustrated in Table 2, in Sample 2-1, the result of the cable bending test was B. On the other hand, in Sample 2-2 to Sample 2-7 and Sample 2-9, the result of the cable bending test was A.

In Sample 2-1, the hardness in second portion 12 was not smaller than the hardness in first portion 11. On the other hand, in Samples 2-2 to 2-7 and Sample 2-9, the hardness of second portion 12 was smaller than the hardness of first portion 11. From this comparison, it was clarified that because the hardness of second portion 12 is smaller than the hardness of first portion 11, the flexibility of insulating layer 10 is enhanced, and the peeling is hardly generated between insulating layer 10 and signal line 20*a* (signal line 20*b*).

[Evaluation of Relationship Between Pull-Out Strength and Insertion Loss of Signal Line 20*a* in Cable 100]

Samples 3-1 to 3-8 of cable 100 were prepared in order to evaluate the relationship between the pull-out strength and the insertion loss when signal line 20*a* in cable 100 is pulled out from insulating layer 10. As illustrated in Table 3, in Samples 3-1 to 3-8, the arithmetic average roughness of signal line 20*a*, the material configuring insulating layer 10, and the pull-out strength when signal line 20*a* was pulled out from insulating layer 10 were changed.

TABLE 3

| | Sample 3-1 | Sample 3-2 | Sample 3-3 | Sample 3-4 | Sample 3-5 | Sample 3-6 | Sample 3-7 | Sample 3-8 |
|---|---|---|---|---|---|---|---|---|
| Material configuring insulating layer 10 | Polyethylene | Polyethylene | Polyethylene | Polyethylene | Polyethylene | Polyethylene | Polyethylene | Polypropylene |
| Arithmetic average roughness (μm) of signal line 20a | 0.005 | 0.009 | 0.04 | 0.13 | 0.23 | 0.54 | 0.81 | 0.13 |
| Pull-out strength (N) of signal line 20a | 0.2 | 0.8 | 8.3 | 41.2 | 63.5 | 82.5 | 92.1 | 32.2 |
| Insertion loss (dB/m) in operating mode | −32 | −21 | −22 | −22 | −23 | −23 | −35 | −21 |
| Evaluation | B | A | A | A | A | A | B | A |

Figure 17:
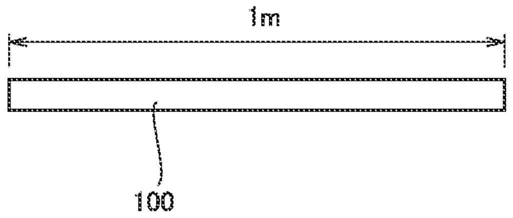
FIG. 17 is a schematic diagram illustrating a sample prepared for evaluating an insertion loss of the cable 100.

FIG. 17 is a schematic diagram illustrating a sample prepared for evaluating the insertion loss of cable 100. As illustrated in FIG. 17, in the evaluation of the insertion loss of cable 100, cable 100 having the length of 1 m was prepared as Samples 3-1 to 3-8.

Figure 18:
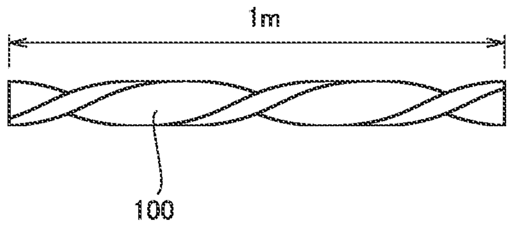
FIG. 18 is a schematic diagram illustrating twist applied to the cable 100 in evaluating the insertion loss of the cable 100.

FIG. 18 is a schematic diagram illustrating twist applied to cable 100 in evaluating the insertion loss of cable 100. As illustrated in FIG. 18, samples 3-1 to 3-8 are twisted. Samples 3-1 to 3-8 are twisted by 180° every 200 mm. As described above, because the length of Sample 3-1 to Sample 3-8 is 1 m, Sample 3-1 to Sample 3-8 are twisted by 2.5 turns. The insertion loss of Sample 3-1 to Sample 3-8 was measured by inputting the signal of the differential mode to Sample 3-1 to Sample 3-8 in the state where the above twist was applied.

"A" in the column of "evaluation" in Table 3 indicates that the insertion loss was less than or equal to −25 dB/m, and the insertion loss was not degraded by the applied twist. "B" in the column of "evaluation" in Table 3 indicates that the insertion loss was greater than −25 dB/m, and the insertion loss was degraded by the applied twist.

As illustrated in Table 3, the evaluation of the insertion loss for Sample 3-1 and Sample 3-7 was B. On the other hand, the evaluation of the insertion loss for Sample 3-2 to Sample 3-6 and Sample 3-8 was A.

In Samples 3-1 and 3-7, the pull-out strength in pulling out signal line 20*a* from insulating layer 10 was not within the range greater than or equal to 0.8 N and less than or equal to 82.5 N. On the other hand, in Samples 3-2 to 3-6 and Sample 3-8, the pull-out strength in pulling out signal line 20*a* from insulating layer 10 was in the range greater than or equal to 0.8 N and less than or equal to 82.5 N. From this comparison, it was clarified that the degradation of the insertion loss of cable 100 can be prevented by setting the pull-out strength in pulling out signal line 20*a* (signal line 20*b*) from insulating layer 10 to greater than or equal to 0.8 N and less than or equal to 82.5 N.

It should be understood that the embodiments disclosed herein is illustrative in all respects and are not restrictive. The scope of the present invention is defined not by the embodiment but by the claims, and is intended to include meanings equivalent to the claims and all modifications within the scope.

REFERENCE SIGNS LIST

10: insulating layer, 10*a*: outer peripheral surface, 11: first portion, 12: second portion, 13: third portion, 14: fourth portion, 15: fifth portion, 20*a*, 20*b*: signal line, 30: intermediate layer, 30*a*: outer peripheral surface, 40: metal oxide layer, 40*a*: first surface, 40*aa*: recess, 40*ab*: protrusion, 40*b*: second surface, 40*ba*: recess, 40*bb*: protrusion, 50: shield, 51: copper layer, 52: first copper layer, 53: second copper layer, 60: catalyst particle, 60*a*: catalyst particle, 60*b*: catalyst particle, 100: cable, 100A: processing target member, 110: bent unit, 300: test piece, 301: first region, 302: second region, 401: first chuck, 402: second chuck, 500: columnar member, 510: tape, DR1: first direction, DR2: second direction, L: distance, S1: preparation process, S2: intermediate layer forming process, S3: heat treatment process, S4: catalyst particle disposing process, S5: oxide layer forming process, S6: electroless plating process, S7: electrolytic plating process, T1, T2: thickness, W1, W2, W3, W4, W5: width

The invention claimed is:

1. A differential signal transmission cable comprising:
- an insulating layer that extends along a longitudinal direction of the differential signal transmission cable;
- a pair of signal lines that extends along the longitudinal direction and is buried in the insulating layer;
- a shield that exists around an outer peripheral surface of the insulating layer; and
- a metal oxide layer that exists between the shield and the insulating layer.

2. The differential signal transmission cable according to claim 1, further comprising an intermediate layer that covers the outer peripheral surface of the insulating layer, wherein the metal oxide layer covers an outer peripheral surface of the intermediate layer.

3. The differential signal transmission cable according to claim 2, wherein the metal oxide layer is a copper oxide layer.

4. The differential signal transmission cable according to claim 2, further comprising a first catalyst particle in the metal oxide layer.

5. The differential signal transmission cable according to claim 4, wherein the first catalyst particle is a particle containing palladium.

6. The differential signal transmission cable according to claim 2, wherein a thickness of the metal oxide layer is smaller than a thickness of the intermediate layer in a section orthogonal to the longitudinal direction.

7. The differential signal transmission cable according to claim 2, wherein the thickness of the metal oxide layer is greater than or equal to 0.001 times and less than or equal to 0.9 times the thickness of the intermediate layer in the section orthogonal to the longitudinal direction.

8. The differential signal transmission cable according to claim 2, wherein the thickness of the metal oxide layer is greater than or equal to 1.5 nm and less than or equal to 223 nm in the section orthogonal to the longitudinal direction.

9. The differential signal transmission cable according to claim 2, wherein
- the metal oxide layer includes a first surface facing an intermediate layer side and a second surface facing a shield side in the section orthogonal to the longitudinal direction, and
- the first surface includes a first recess recessed toward a second surface side and a first protrusion protruding to a side opposite to the second surface in the section orthogonal to the longitudinal direction.

10. The differential signal transmission cable according to claim 9, wherein the second surface includes a second recess recessed toward a first surface side and a second protrusion protruding to a side opposite to the first surface in the section orthogonal to the longitudinal direction.

11. The differential signal transmission cable according to claim 9, wherein the metal oxide layer covers the outer peripheral surface of the intermediate layer over an entire circumference in the section orthogonal to the longitudinal direction.

12. The differential signal transmission cable according to claim 9, wherein the intermediate layer and the shield are partially in contact with each other in the section orthogonal to the longitudinal direction.

13. The differential signal transmission cable according to claim 2, wherein the thickness of the metal oxide layer varies along the outer peripheral surface of the intermediate layer in the section orthogonal to the longitudinal direction.

14. The differential signal transmission cable according to claim 2, wherein the intermediate layer contains polyolefin.

15. The differential signal transmission cable according to claim 2, wherein the intermediate layer contains an acrylonitrile butadiene styrene resin.

16. The differential signal transmission cable according to claim 2, further comprising a second catalyst particle that exists on the intermediate layer.

17. The differential signal transmission cable according to claim 16, wherein the second catalyst particle is a particle containing palladium.

18. The differential signal transmission cable according to claim 1, wherein the shield includes a plating layer.

19. The differential signal transmission cable according to claim 18, wherein the plating layer is in contact with the metal oxide layer.

20. The differential signal transmission cable according to claim 18, wherein the plating layer includes an electroless plating layer.

21. The differential signal transmission cable according to claim 20, wherein the electroless plating layer is in contact with the metal oxide layer.

22. The differential signal transmission cable according to claim 21, wherein adhesive strength between the electroless plating layer and the metal oxide layer is greater than or equal to 0.1 N/cm and less than or equal to 20 N/cm.

23. The differential signal transmission cable according to claim 20, wherein the plating layer includes an electrolytic plating layer.

24. The differential signal transmission cable according to claim 23, wherein the electrolytic plating layer is formed on the electroless plating layer.

25. The differential signal transmission cable according to claim 1, wherein pull-out strength of each of the pair of signal lines from the insulating layer is greater than or equal to 0.8 N and less than or equal to 82.5 N.

26. The differential signal transmission cable according to claim 1, wherein arithmetic average roughness of an outer peripheral surface of each of the pair of signal lines is greater than or equal to 0.009 μm and less than or equal to 0.54 μm.

27. The differential signal transmission cable according to claim 1, wherein in the section orthogonal to the longitudinal direction, the insulating layer includes a first portion that is a portion at a distance of up to 50 μm from the outer peripheral surface of each of the pair of signal lines and a second portion that is a portion at a distance of up to 50 μm from the outer peripheral surface of the insulating layer, and hardness of the second portion is smaller than hardness of the first portion.

28. The differential signal transmission cable according to claim 27, wherein the hardness of the first portion is greater than or equal to 0.02 GPa and less than or equal to 0.11 GPa.

29. The differential signal transmission cable according to claim 27, wherein the hardness of the second portion is greater than or equal to 0.01 GPa and less than or equal to 0.10 GPa.

30. The differential signal transmission cable according to claim 1, wherein the insulating layer contains at least one of polyethylene, a cyclic olefin polymer, polymethylpentene, and polypropylene.

31. The differential signal transmission cable according to claim 1, wherein the insulating layer contains polyolefin having a melting point greater than or equal to 120° C.

32. The differential signal transmission cable according to claim 1, wherein the insulating layer is a foamed resin layer.

33. The differential signal transmission cable according to claim 1, wherein the pair of signal lines is a first signal line and a second signal line, and in the section orthogonal to the longitudinal direction, the insulating layer includes a third portion in which the first signal line is buried and a fourth portion in which the second signal line is buried.

34. The differential signal transmission cable according to claim 33, wherein in the section orthogonal to the longitudinal direction, a width of the insulating layer in a first direction is larger than a width of the insulating layer in a second direction orthogonal to the first direction.

35. The differential signal transmission cable according to claim 34, wherein the third portion and the fourth portion are arranged along the first direction.

36. The differential signal transmission cable according to claim 35, wherein the insulating layer further includes a fifth portion that exists between the third portion and the fourth portion in the first direction and is integrally formed with the third portion and the fourth portion.

37. The differential signal transmission cable according to claim 36, wherein a width of the fifth portion in the second direction is smaller than a width of the third portion in the second direction and a width of the fourth portion in the second direction.

38. The differential signal transmission cable according to claim 1, further comprising:

a first catalyst particle that exists in the metal oxide layer; and a second catalyst particle that exists on the intermediate layer, wherein a total content of the first catalyst particle and the second catalyst particle contained in the differential signal transmission cable is greater than or equal to 0.1 μg and less than or equal to 10 μg per 1 cm along the longitudinal direction.

39. A differential signal transmission cable comprising:

an insulating layer that extends along a longitudinal direction of the differential signal transmission cable;

a pair of signal lines that extends along the longitudinal direction and is buried in the insulating layer; and a shield that exists around an outer peripheral surface of the insulating layer, wherein pull-out strength of each of the pair of signal lines from the insulating layer is greater than or equal to 0.8 N and less than or equal to 82.5 N.

40. A differential signal transmission cable comprising:

an insulating layer that extends along a longitudinal direction of the differential signal transmission cable;

a pair of signal lines that extends along the longitudinal direction and is buried in the insulating layer; and a shield that exists around an outer peripheral surface of the insulating layer, wherein in a section orthogonal to the longitudinal direction, the insulating layer includes a first portion that is a portion at a distance of up to 50 μm from an outer peripheral surface of each of the pair of signal lines and a second portion that is a portion at a distance of up to 50 μm from an outer peripheral surface of the insulating layer, and hardness of the second portion is smaller than hardness of the first portion.

* * * * *